US011000982B2

(12) United States Patent
Stoehr et al.

(10) Patent No.: US 11,000,982 B2
(45) Date of Patent: May 11, 2021

(54) METHODS OF SETTING A SHAPING MACHINE

(71) Applicant: ENGEL AUSTRIA GmbH, Schwertberg (AT)

(72) Inventors: Anton Frederik Stoehr, St. Valentin (AT); Josef Giessauf, Perg (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 15/829,203

(22) Filed: Dec. 1, 2017

(65) Prior Publication Data
US 2018/0178430 A1 Jun. 28, 2018

(30) Foreign Application Priority Data
Dec. 23, 2016 (AT) .............................. A 51183/2016

(51) Int. Cl.
  *B29C 45/76* (2006.01)
  *G06F 30/20* (2020.01)
  (Continued)

(52) U.S. Cl.
  CPC ...... *B29C 45/7693* (2013.01); *B29C 45/0025* (2013.01); *G05B 19/41885* (2013.01);
  (Continued)

(58) Field of Classification Search
  CPC ............. G06F 17/5009; G06F 17/5018; G06F 2217/41; G06F 30/20; G06F 30/23;
  (Continued)

(56) References Cited

U.S. PATENT DOCUMENTS

| 4,816,197 A | 3/1989 | Nunn |
| 5,035,598 A | 7/1991 | Fujita et al. |

(Continued)

FOREIGN PATENT DOCUMENTS

| AT | 507 593 | 6/2010 |
| CN | 1292321 | 4/2001 |

(Continued)

OTHER PUBLICATIONS

C.S. Krishnamoorthy et al., "Artificial Intelligence and Expert Systems for Engineers", 1996, Boca Raton, CRC Press, pp. 29-88.
(Continued)

*Primary Examiner* — M. N. Von Buhr
(74) *Attorney, Agent, or Firm* — Wenderoth, Lind & Ponack, L.L.P.

(57) ABSTRACT

A method of setting a shaping machine includes identifying values for setting parameters, which setting parameters at least partially establish control of controllable components of the shaping machine during the shaping process. A plurality of simulations of the shaping process are performed on the basis of a first parameter and a second parameter. The first parameter describes physical factors of the shaping process. The second parameter is suitable as a basis for at least one of the setting parameters of the shaping machine. The simulation is carried out on the basis of various combinations of values of the first parameter and the second parameter. Values of at least one quality parameter are calculated from results of the simulations for the various combinations of values of the first parameter and the second parameter.

19 Claims, 3 Drawing Sheets

(51) Int. Cl.
 *G05B 19/418* (2006.01)
 *G06F 30/23* (2020.01)
 *B29C 45/00* (2006.01)
 *G06F 113/22* (2020.01)

(52) U.S. Cl.
 CPC .............. *G06F 30/20* (2020.01); *G06F 30/23* (2020.01); *G06F 2113/22* (2020.01)

(58) Field of Classification Search
 CPC ............. G06F 2113/22; B29C 45/0025; B29C 45/7693; B29C 45/76; B29C 45/766; G05B 19/41885
 See application file for complete search history.

(56) References Cited

U.S. PATENT DOCUMENTS

| | | | |
|---|---|---|---|
| 5,900,259 A | 5/1999 | Miyoshi et al. | |
| 6,845,289 B2 | 1/2005 | Salewski et al. | |
| 7,465,416 B2* | 12/2008 | Nagaoka | B29C 33/3835 264/219 |
| 8,060,240 B2* | 11/2011 | Yamagiwa | B29B 17/00 264/40.5 |
| 8,116,903 B2 | 2/2012 | Hsu et al. | |
| 8,182,724 B2 | 5/2012 | Zhang et al. | |
| 8,463,584 B2* | 6/2013 | Yu | B29C 33/3835 700/197 |
| 8,655,476 B2* | 2/2014 | Wang | B22D 46/00 700/146 |
| 9,180,617 B2 | 11/2015 | Tsai et al. | |
| 9,196,169 B2* | 11/2015 | Wallace | G09B 5/02 |
| 9,293,057 B2* | 3/2016 | Zboray | G09B 5/02 |
| 9,566,735 B2 | 2/2017 | Denes et al. | |
| 10,245,771 B2 | 4/2019 | Schiffers et al. | |
| 10,611,071 B2 | 4/2020 | Schiffers | |
| 2001/0051858 A1 | 12/2001 | Liang et al. | |
| 2002/0188375 A1 | 12/2002 | Shioiri et al. | |
| 2003/0014152 A1 | 1/2003 | Salewski et al. | |
| 2004/0230411 A1 | 11/2004 | Zherig et al. | |
| 2004/0256755 A1 | 12/2004 | Baba et al. | |
| 2006/0282186 A1 | 12/2006 | Hansen et al. | |
| 2008/0099943 A1 | 5/2008 | Yamagiwa et al. | |
| 2009/0089032 A1* | 4/2009 | Sturrock | G05B 17/02 703/7 |
| 2010/0168898 A1 | 7/2010 | Hsu et al. | |
| 2010/0295199 A1 | 11/2010 | Zhang et al. | |
| 2011/0295404 A1* | 12/2011 | Malinowski | B22D 46/00 700/104 |
| 2012/0310603 A1* | 12/2012 | Hansen | B22D 17/00 703/1 |
| 2013/0144578 A1* | 6/2013 | Steffes-Lai | G05B 17/02 703/2 |
| 2013/0270728 A1 | 10/2013 | Denes et al. | |
| 2013/0345855 A1 | 12/2013 | Tsai et al. | |
| 2014/0121820 A1* | 5/2014 | Das | G05B 13/04 700/182 |
| 2014/0371905 A1* | 12/2014 | Eberst | B25J 9/1664 700/253 |
| 2016/0121532 A1 | 5/2016 | Kraibühler et al. | |
| 2016/0208711 A1* | 7/2016 | Dull | G06N 20/00 |
| 2016/0229101 A1 | 8/2016 | Schiffers | |
| 2016/0250791 A1 | 9/2016 | Schiffers et al. | |
| 2017/0177754 A1* | 6/2017 | Jin | G05B 19/4184 |
| 2017/0308057 A1* | 10/2017 | Kreidler | G05B 19/4069 |
| 2018/0060456 A1* | 3/2018 | Phatak | G06F 9/5027 |
| 2018/0268326 A1* | 9/2018 | Aoki | G05B 17/02 |

FOREIGN PATENT DOCUMENTS

| | | |
|---|---|---|
| CN | 1780723 | 5/2006 |
| CN | 201002333 | 1/2008 |
| CN | 101168283 | 4/2008 |
| CN | 101234524 | 8/2008 |
| CN | 101269537 | 9/2008 |
| CN | 101286041 | 10/2008 |
| CN | 101770217 | 7/2010 |
| CN | 101890792 | 11/2010 |
| CN | 103914581 | 7/2014 |
| CN | 105228808 | 1/2016 |
| CN | 105592999 | 5/2016 |
| CN | 105599256 | 5/2016 |
| CN | 105636757 | 6/2016 |
| CN | 105904692 | 8/2016 |
| DE | 103 60 530 | 3/2005 |
| DE | 10 2013 008 245 | 11/2014 |
| DE | 10 2015 107 024 | 7/2016 |
| EP | 0 368 300 | 5/1990 |
| EP | 0 747 198 | 12/1996 |
| EP | 1 253 492 | 10/2002 |
| EP | 2 539 785 | 1/2013 |
| EP | 2 679 376 | 1/2014 |
| TW | 1257894 | 11/2004 |
| WO | 01/67193 | 9/2001 |
| WO | 2014/183863 | 11/2014 |

OTHER PUBLICATIONS

A. Schötz, "Abmusterung von Spritzgierßwerkzeugen", 2013, Munich, Karl Hanser Verlag., pp. 31-220.

C. Jaroschek, "Spritzgierßen für Praktiker", 3$^{rd}$ Edition, Munich, Karl Hanser Verlag., pp. 31-98.

B. Fein, "Optimierung von Kunststoff-Spritzbießprozessen", 2013, 2$^{nd}$ Edition, Berlin, Beuth Verlag GmbH, pp. 65-120.

Kunststoff-Institut Lüdenscheid, 2013, Störungsratgeber, 12$^{th}$ Edition, Unna: Verlagsgesellschaft GmbH, pp. 6-178.

D.C. Montgomery, "Design and Analysis of Experiments", 2013, 8$^{th}$ Edition, Wiley, pp. 1-23.

\* cited by examiner

METHODS OF SETTING A SHAPING MACHINE

BACKGROUND OF THE INVENTION

The present invention concerns methods of setting a shaping machine, by which a cyclically proceeding shaping process is carried out.

In particular, the invention concerns methods in which values for setting parameters, which setting parameters at least partially establish control of controllable components like, for example, drives of the shaping machine during the shaping process are identified, performing a plurality of simulations of the shaping process on the basis of at least one first parameter and at least one second parameter, wherein:

a) the at least one first parameter describes physical factors of the shaping process, b) the at least one second parameter is suitable as a basis for at least one of the setting parameters of the shaping machine, c) the simulation is carried out on the basis of various combinations of values of the at least one first parameter and the at least one second parameter, d) values of at least one quality parameter are calculated from results of the simulations for the various combinations of values of the at least one first parameter and the at least one second parameter, and e) a shaping machine 1 is provided (such as that shown in FIG. 3).

In that respect, shaping machines can be, for example, injection molding machines, injection presses, presses, and the like. Shaping processes similarly follow that terminology.

Hereinafter, the state of the art is set forth in relation to injection molding machines (for brevity "IMM") and injection molding processes (for brevity "IM processes"). The conclusions, however, apply more generally to shaping machines and processes.

Experimental Procedure for Machine Setting

Nowadays, like also 30 years ago, setting of an injection molding machine is effected by setting individual setting parameters by hand in the machine control. Many assistance systems are in use in order to support the operator during the setting operation. In general, the stepwise procedure involving a trial-and-fail approach or a one-parameter-at-a-time approach is still current. The success of that procedure is heavily dependent on the experience and the skill of the respective operator. Expert knowledge which is available in software-implemented form or in printed guidebooks can be helpful in finding a working point which leads to plastic products of adequate quality. Optimization of the injection molding process can also be assisted by the art of statistical test planning. A purely experimental method leads to acceptable processes. However these are often not particularly robust in relation to disturbance influences, and at best form one of many local optima in a comparatively large parameter range.

Simulations for Machine Setting

Pure simulation of injection molding processes and implementation of process optimization operations which are carried out by test planning, with subsequent transfer of setting parameters into the IMM control are state of the art. It is also state of the art to find by simulations ranges of setting parameters (process windows), within which a process delivers products enjoying properties within predetermined tolerances. Terms like "virtual molding" or "virtual tool sampling" are in circulation.

By virtue of the complication and expenditure linked thereto, however, the availability of suitable software and trained personnel simulations for the purpose of, and in the forefront of, tool sampling do not yet appear to have become established in practice. Software providers, however, advertise the advantages of a holistic approach from component design by tool construction to series production. Besides the pure cavities in that respect, the rest of the IM process including sprue system and temperature conditioning is also involved. Accordingly, the aim is to make it possible to determine at least the necessary machine capability, estimate a rough working point, and analyze in advance influences or tendencies of various parameters. In general, the real machine behaviour together with slacknesses and reaction times are not taken into consideration, but in many cases various parameters are varied only within certain close limits of a respective IMM model.

By virtue of the ongoing developments in powerful computers, improvements in the computation methods like, for example, the finite element method (FEM), and refinements in the underlying process models, process simulations can in the meantime supply realistic results in principle, provided that the boundary conditions in the simulation were correctly selected. In practice, the results obtained by simulation, and thus "offline" optimization operations carried out regularly, markedly differ from reality in a process-determining relationship.

The non-ideality of environment, machine, tool, regulation, or material in general makes it difficult to determine a robust process window for the injection molding process or indeed a suitable optimum working point.

EP 1 253 492 A2 discloses a method of determining properties of an injection-molded part, wherein neuronal networks and mathematically analytical methods are used.

EP 2 539 785 A1 discloses a method of regulating an injection molding process using data from preceding cycles to modify process setting parameters in such a way as to give improved quality features in respect of the parts produced.

U.S. Pat. No. 2,006,282 186 A1 discloses a method of optimizing a process, wherein by simulations a plurality of solutions for the process are calculated and in a separate method step those solutions are adopted, which are closest to an optimum value for certain parameters.

EP 0 747 198 A2 involves optimization of an injection molding process, wherein respective closure-side and injection-side settings are optimized separately with the assistance of databanks.

U.S. Pat. No. 2,002,188 375 A1 discloses a method using "computer assisted engineering" (CAE) in order to optimize process settings iteratively.

EP 0 368 300 A2 discloses a method in which simulation of a shaping process and a real shaping process ate alternately carried out, the simulation being adapted in each case by means of results from the real test.

DE 10 2015 107 024 B3 discloses a method in which an injection operation of an injection molding process is simulated and virtual results are compared to real-measured event patterns.

U.S. Pat. No. 4,816,197 A discloses a method of controlling an injection molding process, wherein so-called pvT (pressure-volume-temperature) optimization is carried out, with observation of viscosity.

DE 10 2013 008 245 A1 discloses a method of operating an injection molding machine with a control in which expert knowledge about operation of the injection molding machine and its possibly present peripheral devices and the production of injected parts in the injection molding procedure is stored.

EP 2 679 376 discloses a method wherein simulations of injection molding processes are carried out in a cloud server and stored in a cloud memory.

Method are therefore required which make it possible to make the items of information obtained by simulation useable in the real shaping machine process.

Hitherto, it was usual during a sampling operation that an operator performs injection molding trials and assesses the products in the accustomed fashion (in regard to filling degree, distortion and so forth). In the normal case, the operator re-adjusts machine parameters until the resulting moldings are of a quality within predetermined tolerances. Optical appraisal of the components can be supplemented by consideration of signal patterns from included sensor systems, measuring of critical component dimensions, or weighing the component masses.

Hitherto, it has been the general practice that an operator predominantly uses his experience in dealing with shaping machines (for example IMMs) in order to solve problems which occur. Additional reference to technical literature and guidebooks can be helpful in that respect. Those aids frequently contain errors which occur, list possible causes and propose procedures for eliminating the same.

It would often be helpful to be able to understand the process implementation or to be able to look into the mold during the filling operation. That is generally not possible by virtue of the nature of the process. Only finished products outside the tool can be appraised. Pressure and temperature sensors can supply only locally limited information about the process. Measurements are often falsified on the basis of the methodology used (systematic errors). In regard to filling problems, partial fillings and so-called filling studies could be carried out. However, these can be time-intensive and expensive (in particular when dealing with large components). Partial fillings are also often linked to problems, for example, in regard to de-moldability.

SUMMARY OF THE INVENTION

The above-discussed object is attained by a method of setting a shaping machine 1, by which a cyclically proceeding shaping process is carried out, by identifying values for setting parameters, which setting parameters at least partially establish control of controllable components like for example drives of the shaping machine 1 during the shaping process, performing a plurality of simulations of the shaping process on the basis of at least one first parameter and at least one second parameter, wherein the at least one first parameter describes physical factors of the shaping process, and the at least one second parameter is suitable as a basis for at least one of the setting parameters of the shaping machine 1 (A), the simulation is carried out on the basis of various combinations of values of the at least one first parameter and the at least one second parameter (B), values of at least one quality parameter are calculated from results of the simulations for the various combinations of values of the at least one first parameter and the at least one second parameter (C), and the shaping machine 1 is provided.

Furthermore, in the method, a value implemented at the shaping machine 1 of the at least one first parameter is ascertained by measurement (E), a value of the at least one second parameter is determined from the value measured in accordance with step (E) of the at least one first parameter so that a substantially optimum value of the at least one quality parameter is presented (F), and a setting value is set at the shaping machine 1 for the at least one setting parameter (G), which setting value is the value determined in accordance with step (F) of the at least one second parameter and/or is determined from the value determined in accordance with step (F) of the at least one second parameter.

It is therefore possible to remedy the problem that results of simulations often do not coincide with reality because sometimes simulations crucially depend on the assumed boundary conditions, the measured material data, the underlying physical models, and calculation methods.

Ultimately, this is reflected in an improved closed-loop/open-loop control of the shaping machine and in a more economical and more robust shaping process. In addition, parts of adequate and constant quality are the result.

Differences between theory/idealization and practice/reality can in that respect stem from differing material properties, material fluctuations, batch fluctuations, environmental influences, dimensions of machine components, dimensions of tool components and machine behaviour. All those sources for simulation results that differ from reality can be dealt with by the present invention.

DETAILED DESCRIPTION OF THE INVENTION

Figure 1:
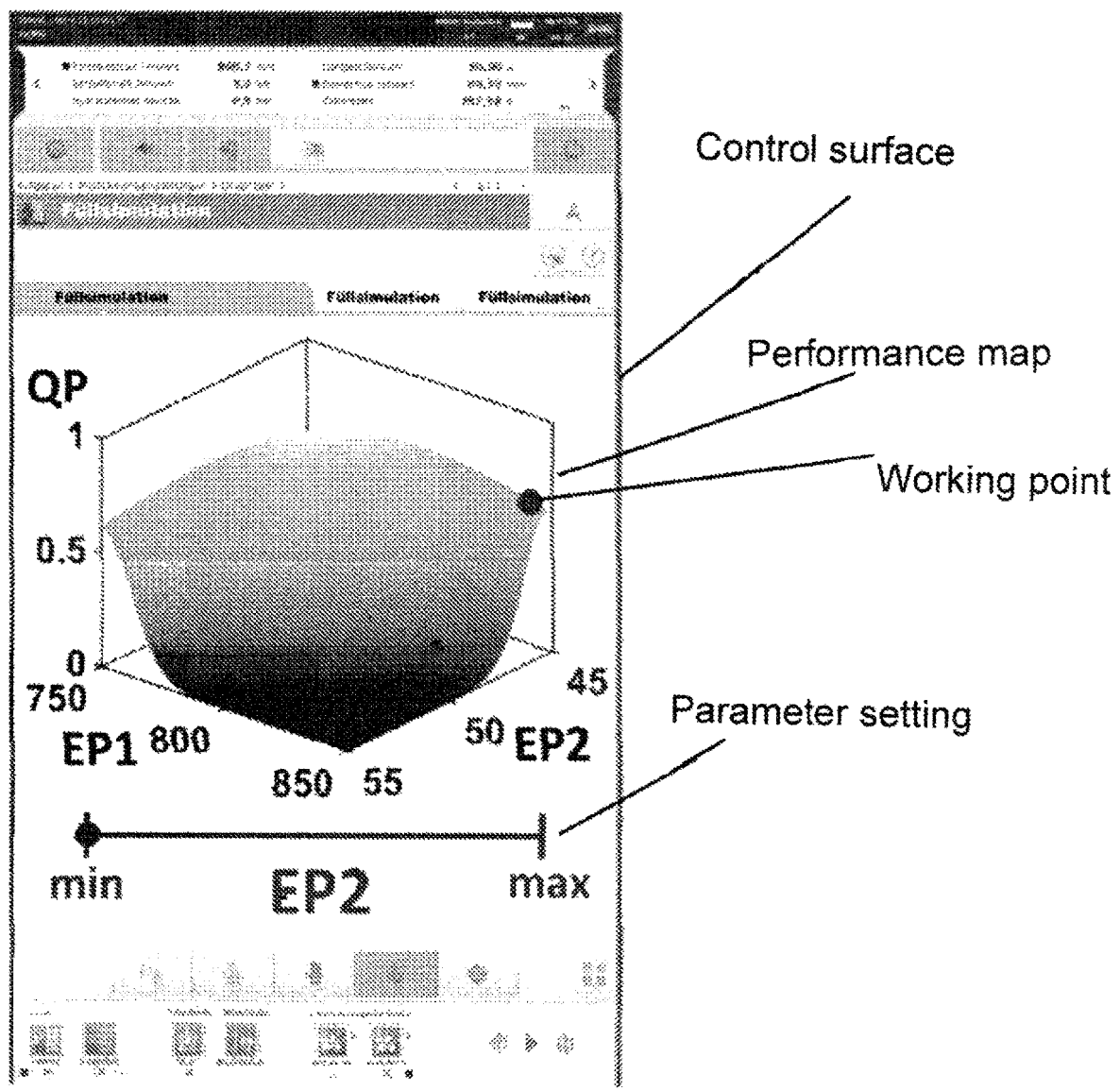
FIG. 1 is a diagram representing a display screen page of the control in which a performance map is shown.

As noted above and shown in FIG. 2, a method includes selecting a first parameter and a second parameter (step A), simulations are carried out on the basis of various combinations of values of the at least one first parameter and the at least one second parameter (step B), values of at least one quality parameter are calculated from results of the simulations for the various combinations of values of the at least one first parameter and the at least one second parameter (step D), and the shaping machine 1 is provided.

A value implemented at the shaping machine 1 of the at least one first parameter is ascertained by measurement (step E), a value of the at least one second parameter is determined from the value measured in accordance with step (step E) of the at least one first parameter so that a substantially optimum value of the at least one quality parameter is presented (step F), and a setting value is set at the shaping machine 1 for the at least one setting parameter (step G), which setting value is the value determined in accordance with step F of the at least one second parameter and/or is determined from the value determined in accordance with step F of the at least one second parameter.

The invention can be implemented as a procedure based on FEM (Finite Element Method) simulations, that, having regard to boundary conditions which are not exactly known, delivers performance maps consisting of machine and quality parameters. Based on that performance map, and jointly with boundary conditions which are ascertained in reality, a machine setting is found at the injection molding machine with which products of adequate quality can be produced.

To determine the second value from which a substantially optimum value of a quality parameter is produced, it is possible to adopt as a criterion the fact that adaptation (which is as good as possible) of an actual value to a target value or a target range is performed. The target value can occur as an extreme of a calculated relationship or as a presetting by an operator.

The adaptation referred to can involve optimization of a quality parameter or a so-called multi-criterial optimization (that is to say, when a plurality of quality parameters are processed).

Both the at least one first and also the at least one second parameter can be functions, for example, in time- and/or travel-dependent relationship.

Measurement of the at least one first parameter measurement can be effected directly or indirectly. That is to say, in the case of indirect measurement, a measured value can be converted, for example, by computing operations so that the actually measured value matches the at least one first parameter.

In determining the quality parameters in accordance with method step D in which values of at least one quality parameter are calculated from results of the simulations, at least one value of at least one quality parameter can be calculated in particular for substantially each one of the combinations of values of the at least one first parameter and the at least one second parameter. For certain combinations of values of the at least one first parameter and the at least one second parameter, calculation of the values of the at least one quality parameter can be left out if, for example, it is clear from the procedure involved in the simulation that in those cases no useable setting parameters/setting values emerge.

The quality parameters can be identical, similar or different physical variables for the various combinations of values of the at least one first parameter and the at least one second parameter.

Adaptation of Performance Maps

A performance map generated by the simulations (quality parameter versus at least one first parameter and at least one second parameter) can be modified on the basis of material-related boundary conditions identified at the shaping machine 1 so that a theoretical optimum derived from the simulations is transposed into a real optimum. In other words, the simulation results can be adapted to the real boundary conditions. More specifically, that step can involve adaptation of the performance maps per se, (slightly) varying values for compressibility and viscosity, that is to say pressure transmission and the flow properties.

The respectively necessary modification, that is to say the manner of modification (for example linear offset, multiplication) or the manifestation thereof (in what direction and how greatly) can be known in advance. The respectively necessary modification can be determined for example by stimulation using varying material-related boundary conditions.

The necessary modifications can be similar for different types of plastics and for different component groups. Accordingly, a calculation based on the necessary modifications would not have to be carried out for each individual case, but it would be possible to have recourse to an existing databank 4 with necessary modifications for the respective plastic/component combinations.

Multi-Stage Optimization

Multi-stage use and adaptation of the performance map can take place by an interaction between simulations and experiments which are carried out in reality. That is to say, method step D of FIG. 2 can be repeated after method steps E, F, and G have already been carried out once. Naturally, in that case, other parameters or values can be selected for the at least one first parameter and the at least one second parameter.

The general idea of multi-stage optimization is feeding experimentally ascertained data (in relation to the material, the machine behaviour, the process and the product) back into the simulation. The purpose of that feedback is to adapt the simulation to the real boundary conditions. Based on 'n' iterations of alternating simulations-measurements-feedbacks-adaptations, the aim in that way is to find a machine setting which results in satisfactory products.

First of all, simulations are performed, in which the material-related boundary conditions used are those as are set forth in the literature or in databanks or were measured in the laboratory. Process and machine parameters (setting parameters) are varied in the individual simulations and thus a predetermined parameter range is covered. Those data points which are calculated stepwise are used by regression analysis to generate performance maps which set quality parameters related to the product and the overall process in relation to the process and machine parameters (setting parameters).

From the performance maps, it is possible to determine a provisional process optimum which however (as already explained in greater detail hereinbefore) does not necessarily have to correspond to a real optimum. Nonetheless, information related to the respective injection molding tool, concerning the products or cavities, the sprue system and so forth was obtained. Trends or dependencies within that information retain their validity even if the material-related boundary conditions change.

The provisional optimum is used to obtain first items of process information in the form of products or measurement data. The products are assessed in respect of their quality by visual control, weighing, or measurement. Process measurement data can correspond, for example, to variations in the real machine behaviour like specific injection pressure or the real injection speed. In addition, material-related properties (viscosity, compressibility and so forth) can be determined by suitable tests.

The experimentally ascertained items of information are used in a further step in order to perform fresh simulations with boundary conditions which are adapted to reality. Those fresh simulations generate a new performance maps or modify the existing one in order then to provide a machine setting which results in products enjoying properties within predetermined tolerances.

By applying the invention to injection molding processes, it is possible to implement a digital injection molding machine (D-IMM) which makes the injection molding process simulatable with regard to the machine behaviour, the tool, and the plastic.

The invention can provide a tool by which a functioning machine setting of a real shaping machine 1 can be found as independently as possible. Ideally, a machine setting ascertained in that way would come as close as possible to a real optimum or would lead relatively easily to an optimum at the real shaping machine 1. The advantage for operators would firstly be a time savings during sampling, secondly an additional understanding of the process, which would also be available for example directly at the shaping machine 1, thirdly a process markedly within a robust process window, and fourthly an efficient process in regard to energy and time. The data obtained during the simulation could serve for ongoing regulation with the shaping process running, and could thus also guarantee stability in further production.

An important aspect of the invention is the subsequent comparison of simulation and experiment (i.e., adaptation of the setting set found under idealized assumptions to the real boundary conditions of the injection molding process). Computer-aided simulations can also take place in parallel, alternately, or following a real setting procedure or production.

Applicable aims in each case are a successful, stable and efficient shaping process. Numerical calculations can serve for process understanding, insofar as the shaping process with its various process variables can be displayed in time-discretized relationship (i.e., in the form of virtual and interactive filling studies which match the respective inputs in the machine. In that way, a process technician is supported in solving problems in the shaping process, in the shaping tool, in the shaping machine 1, or the product, with additional items of information.

Fresh options are afforded with increasing sensor systems, computing power, networking, and data storage. Thus, for example, collected information can serve to constantly improve the underlying models of the simulation.

Boundary Conditions in Simulations

Numerical simulations afford results based on models and boundary conditions. The boundary conditions include material properties like, for example, melt viscosity or pvT (pressure-volume-temperature) behaviour in the case of plastics. Other boundary conditions concern machine parameters such as cylinder and nozzle temperatures, tool-related parameters such as the tool wall temperature, and sprue-related parameters such as runner diameter and temperatures. It is also conceivable that the exact geometry of cavities varies, more specifically in the sense that during sampling, slight modifications are also made or wear occurs during production. In particular, in relation to the overall volume of the cavity, the dimensions of gates or the precise texture of the surfaces of the cavities, there can be considerable differences in the process.

Material-Related Boundary Conditions

Material-related boundary conditions are, for example, viscosity, compressibility, the pvT (pressure-volume-temperature) behaviour, specific thermal capacity, heat transfer coefficients, thermal conductivity, crystallization behaviour, a critical temperature below which essentially no more material flow occurs (freezing point, low-flow temperature), or the specific thermal capacity. In general, material properties can depend on physical parameters like temperature, pressure, shearing and so forth.

Material-related boundary conditions can be measured, for example, beforehand in the laboratory by various methods or can be requested of the manufacturer. As is known, material properties are dependent on the respective working point and accordingly vary with prevailing pressure, temperature, or shearing speed. A laboratory-measured behaviour of a plastic does not necessarily correspond to its behaviour under real conditions in the shaping machine 1. The latter is, for example, to be attributed to comparatively high pressures and flow rates in the injection molding process. It is also known that there are batch-dependent fluctuations in the material properties, which are to be attributed to the original plastic granular material production process. Also, subsequent addition of additives such as coloring agents (masterbatch) can crucially influence the flow behaviour of plastics.

Material-related boundary conditions also depend on the specific processing conditions such as various temperatures occurring in the process. Admittedly, values concerning the tool or nozzle temperatures can be predetermined and regulated in the control system of the IMM, but often those values do not correspond to the actually relevant values of temperature or temperature distribution of the melt or the surface temperatures of cavities in the tool. Rather, certain offsets or shifts are to be assumed to apply here, which are governed by the construction of the regulators and the fitted sensor system.

The invention makes it possible to transfer the process procedures which are obtained and optimized from simulations as setting sets into the real shaping machine 1, wherein variations in the boundary conditions can be taken into account and corrections can possible be effected at the real shaping process.

The invention can be used, in particular, for setting a plastic-processing machine in as optimum a fashion as possible.

The at least one first parameter can include at least one of the following:

parameters concerning kinematics, dynamics, regulators of all kinds and wear state; and/or parameters concerning a shaping tool, in particular cavity geometry, sprue geometry, hot runner geometry, nozzle geometry, tool material properties, cavity texture, venting, wear, thermal capacity, and/or parameters concerning the shaping machine 1, in particular injection assembly, dynamics, kinematics, regulator, cylinder diameter, behaviour of the backflow blocking means, screw geometry, nozzle geometry, closing side, rigidity, friction, and/or parameters concerning a material used in the shaping process, in particular filler composition, filler proportion, masterbatch, additives, moisture content, viscosity, pvT (pressure-volume-temperature) behaviour, thermal conductivity, thermal capacity, coefficient of expansion, modulus of elasticity, shear modulus, coefficient of thermal expansion, and/or parameters concerning peripheral devices used in the shaping process, in particular pre-drying, material feed, temperature conditioning, circulating pumps, material mixers, and/or parameters concerning environmental influences, in particular air humidity and ambient temperature.

The at least one second parameter can concern at least one of the following: metering rotary speed profile, dynamic pressure profile, cylinder temperature profile, tool opening and closing profile, closing force profile, metering volume, hot runner temperatures, injection speed profile, post-pressure profile, post-pressure time, switching-over point, peak pressure limit, compression relief strokes, ejector motion profile, tool core motions, temperature conditioning agent temperatures, cooling time and removal device motion profile.

In the selection of the at least one first parameter and/or the at least one second parameter, an expert system 3 can be used, and preferably value ranges for the at least one first parameter and/or the at least one second parameter are predetermined. (Naturally it is also possible to select a plurality of first parameters and a plurality of second parameters and use them in the method according to the invention.)

An expert system 3 in the sense in which it is understood here can be understood as an intelligent databank 4 integrated in a computing system (see for example Krishnamoorthy, C. S. and S. Rajeev (1996): *Artificial Intelligence and Expert Systems for Engineers*, Boca Raton: CRC Press, pages 29-88). It contains systematized and programmed basic knowledge about the rules of the shaping process, as can be found for example from pertinent literature (see Schötz, A. (2013): *Abmusterung von Spritzgiesswerkzeugen*, Munich: Karl Hanser Verlag, pages 31-220; Jaroschek, C. (2013): *Spritzgiessen für Praktiker*, 3rd edition, Munich: Karl Hanser Verlag, pages 39-98; Fein, B. (2013): *Optimization of Kunststoff-Spritzgiessprozessen*, 2nd edition, Berlin: Beuth Verlag GmbH, pages 65-120; Kunststoff-Institut Lüdenscheid (2013): Störungsratgeber, 12th edition. Unna: Horschler Verlagsgesellschaft GmbH, pages 6-178). In addition, rules can be programmed in an expert system 3, which represent generalities of modes of procedure for machine setting, error recognition or error avoidance of experienced process technicians and specialists for setting shaping machines. Such a regulating mechanism or basic knowledge can occur for example in the form of truth functions or transformation charts. With known molding geometries, materials, machines and quality requirements, on the basis of the programmed knowledge and the rules, an expert system 3 can make rough estimates about values of ranges of process parameters, which lead to successful machine settings.

In the context of the selection of the at least one first parameter and the at least one second parameter in step A, known data are taken into consideration about at least one of the following: shaping machine 1, shaping tool, sprue system, material processed in the shaping process, quality criteria and earlier machine settings.

The data can be provided by a databank 4. The items of information which are obtained with the method according to the invention can be centrally managed and provided by a databank 4.

The at least one quality parameter can concern at least one of the following:

process properties, in particular individual process times, overall cycle time, robustness, tool loading, energy consumption, necessary closing force, melt temperature, maximum injection pressure, environmental influencing, temperature conditioning requirement, economic efficiency, machine loading, necessary machine size, and/or component properties, in particular shrink marks, dimensional accuracy, color streaks, air streaks, grooves, weld lines, burr, shrinkage, sizes/dimensions, demolding temperature, frozen edge layer thickness, temperature conditioning requirement, material homogeneity, burns, distortion, material damage, color homogeneity, mass, mechanical stability and thermal stability.

Values of at least two quality parameters can be calculated per combination of values of the at least one first parameter and the at least one second parameter, wherein weighting of the at least two quality parameters is used. By virtue of such a weighting, more influence on the setting of the shaping machine can be imparted to more important quality parameters.

The weighting of the quality parameters can be selected on the basis of a global quality criterion (multi-criterial optimization). As quality criteria, it is possible for example to adopt the following: reduced distortion or greater dimensional accuracy of the moldings produced, greater robustness of the shaping process, smaller amounts of reject, fewer or smaller surface defects and reduced cycle time.

As noted in step C, one of the following process variables can be calculated from the results of the simulations and used at least in part as a basis for calculation of the values of the at least one quality parameter: process variables, in particular mass temperature, shear rate, shear stress, degree of filling, tool wall temperature, density, pressure, viscosity, speed, volume shrinkage, filler distribution and orientation, and mass homogeneity.

The simulations include at least one—preferably all—of the following:

process simulation corresponding to a process model, in particular a simulation of plasticization, the filling process, the post-pressure phase, the cooling phase, demolding, and/or material simulation corresponding to a material model, in particular a simulation of the flow behaviour, the thermal behaviour, the mechanical behaviour and the elastic behaviour, and/or control simulation corresponding to a control model, in particular a simulation of the control, the regulators of individual controllable components, the machine implementation, and/or machine simulation corresponding to a machine model, in particular simulation of the injection assembly, the closing mechanism, and the robotics, and/or temperature conditioning simulation corresponding to a temperature conditioning model, in particular simulation of heat transport, heat transfer and the flow properties.

In the context of the simulations, a mathematically analytical model and/or a numerical model of the shaping machine 1 and/or the shaping process is used. The simulation/numerical models can be carried out using the known methods (for example finite element method, finite volume method, finite difference method).

A selection of values for the at least one first parameter and the at least one second parameter can be carried out by means of statistical test planning. By clever omission of certain parameter combinations it is possible to save on simulations (and the corresponding resources (see Montgomery, D. C. (2013): Design and Analysis of Experiments, 8th edition, Wiley. pages 1-23.)

Figure 2:
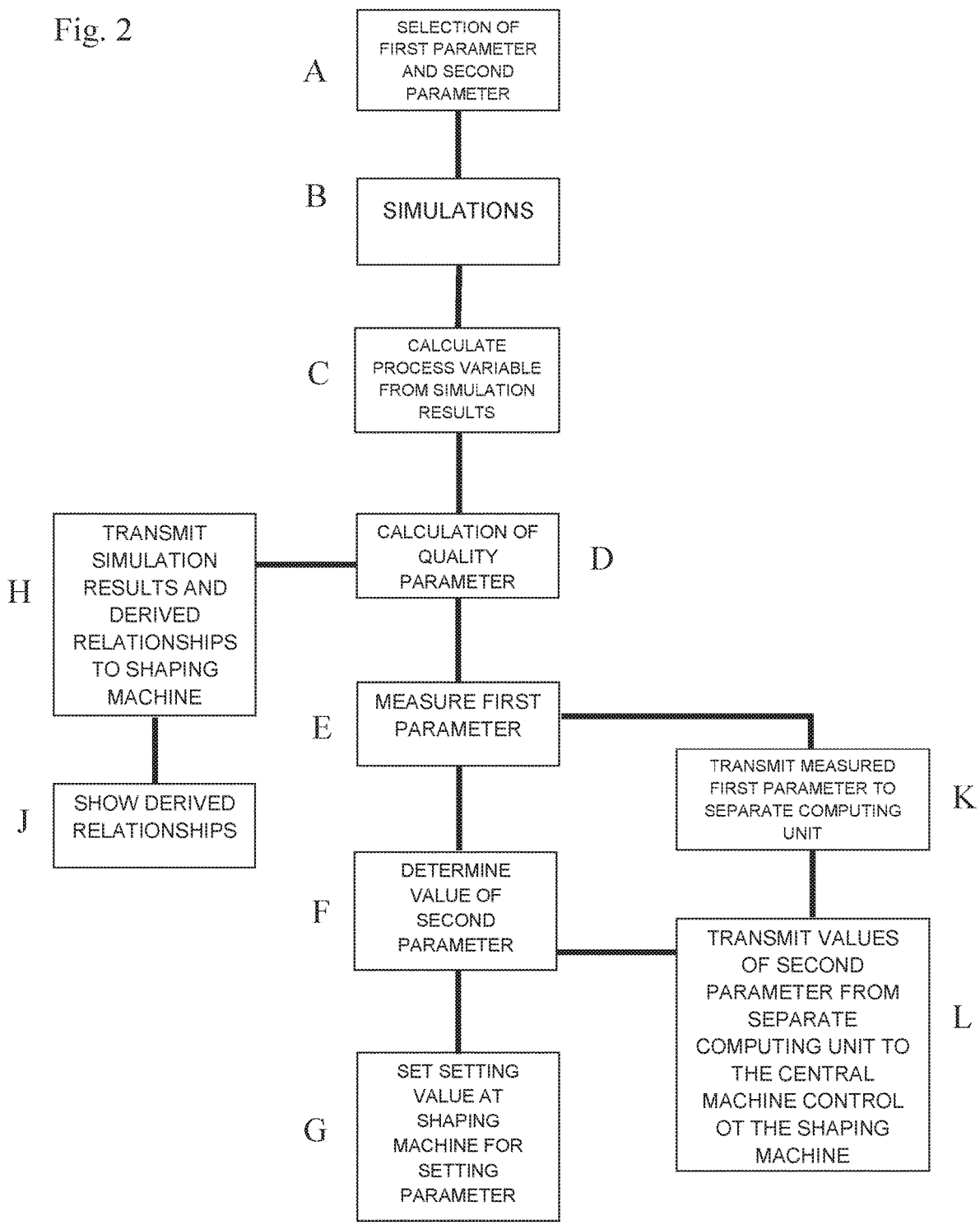
FIG. 2 is a flowchart indicating the steps of setting a shaping machine according to the invention described herein.
Figure 3:
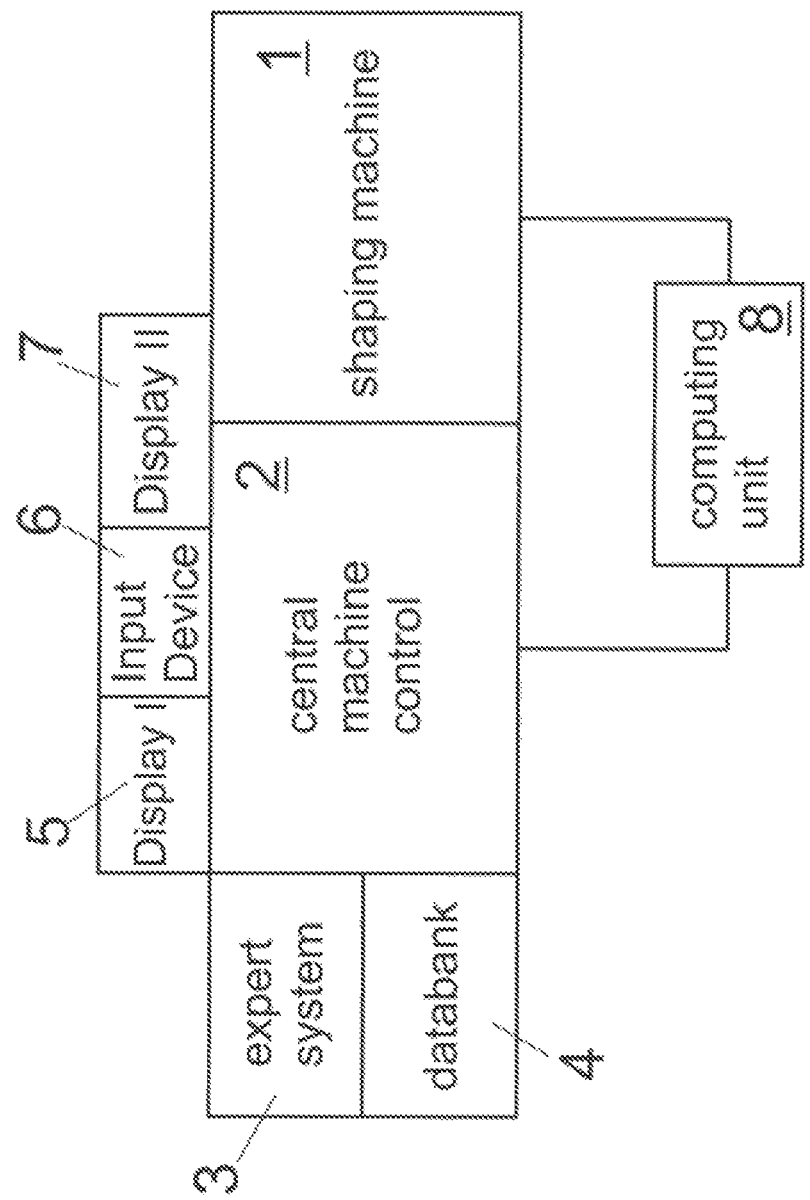
FIG. 3 is a block system diagram of a conventional shaping tool in which the method herein can operate.

Results of the simulations and/or relationships derived from the results of the simulations between the at least one first parameter, the at least one second parameter and the at least one quality parameter can be transmitted to the shaping machine 1 and preferably stored in a central machine control 2 (see step H of FIG. 2). By virtue of the fact that the relationships ascertained in that way are known at the shaping machine 1, it is possible to react quickly and easily to changes in the environment (of the at least one first parameter).

It can be provided that in the context of carrying out method step E of FIG. 2, at least one of the following is carried out: measuring at least one length (for example of machine components, for example by means of a caliper), carrying out viscosity measurement (for example by means of a rheometer nozzle ar a rheometer tool), ascertaining the value implemented at the shaping machine 1 of the at least one parameter by signals present at the shaping machine 1, in particular force variations and/or pressure variations, manual inputs via an input device 6 by an operator, ultrasound analysis methods, mass spectroscopy, X-ray spectroscopy, computer tomography, optical profilometry, use of a coordinate measuring device, moisture measurement and performing temperature measurement and other laboratory devices or measuring devices.

The value of the at least one first parameter ascertained in method step E can be transmitted to a separate computing unit 8 (see step K of FIG. 2) and the value ascertained in accordance with step F of the at least one second parameter, preferably derived on the basis of relationships modeled by results of the simulations, can be transmitted from the separate computing unit 8 to the central machine control 2 of the shaping machine 1 (see step L of FIG. 2). In that way, computing resources which have to be provided at the shaping machine 1 can be saved. It is still more important that by virtue of that measure certain parts of the calculations in the context of the simulations can be carried out independently of the shaping machine 1 itself.

It can be provided that, before carrying out method step G, that is to say before using the given value of the at least one second parameter, the results of the simulations are checked in relation to quality and viability. That can be checked for example in relation to machine capabilities, the attainable material through-put (for example of a plasticizing unit) and material loading limits. That can be used in particular when certain aspects of the shaping process were handled in simplified fashion in the simulations. If, for example, maximum temperatures which a plastic being processed can bear were not taken into consideration in the simulation, it is possible subsequently to check in retrospect whether they were adhered to in the corresponding solution. A corresponding consideration applies to machine capabilities and the attainable material through-put.

Visualization in the Control

In accordance with the present invention, the derived relationships can be shown at the shaping machine 1, preferably in the form of performance maps on a display 5 (see step J of FIG. 2). In that way, the previously simulatively obtained process information can be additionally processed and, for example, visualized in a central machine control 2 of the shaping machine 1. That can facilitate further manual setting, optimization, and fine adjustment of the machine.

Alternatively or additionally to a performance map, a value of the at least one quality parameter associated with a combination of values of the at least one first and the at least one second parameter can be represented at the shaping machine 1 on a display 7.

Operators can select which dependent and independent parameters out of the array of the at least one first parameter and the at least one second parameter are represented.

In that respect, automatic restriction of the display ranges of the performance maps can be provided on the basis of previously defined criteria.

A representation of a current operating point/working point and/or a prognosticated operating point/working point on the basis of a provisional change in setting parameters in the performance maps can also be provided. A representation of quality prognoses can also be provided.

In addition it is possible to provide an at least partial representation of the CAD data of tool, sprue system, nozzles and injection assembly.

That can also involve a representation of a filling image and time-dependent process data.

Overall it should be made possible for the operator of the shaping machine 1 by time-resolved representation ("scrolling in time") to obtain the process procedure in graphically illustrated form.

This can involve, for example, states of the process like local material densities, pressures or temperatures which according to the invention can be displayed for discrete time steps. Sections through the volume can be virtually made and thus insights about the "interior" of the component can be acquired. In that way, it would be possible to help in error elimination by enhanced process understanding.

Simulations are valid in detail only for a given process setting. It can therefore be helpful to update the simulation simultaneously with changes to the machine settings and to make the results thereof visually apparent (multi-stage optimization).

At the same time it can be helpful to the operator to receive in clearly illustrated form where the process is just at in the parameter range and what change in the machine setting have or would have which consequences.

In the course of these simulations, large amounts of data are generated. A setting assistant can analyze those data (modeling) and generate therefrom performance maps in which quality features are displayed as a function of machine parameters. For example, by means of regression methods it is possible to ascertain an optimum which is transmitted to the shaping machine 1 or to the operator in the form of a machine setting set. Optionally, performance maps can be passed to the shaping machine 1 and adaptation to the real material-related or machine-related boundary conditions can be implemented by means of experimental methods.

In order also to profit from the generated data in the best possible fashion during the real setting operation they can be processed in a suitable fashion, passed to the shaping machine 1 and made accessible to the operator in a convenient and lucid fashion.

The kinds of representation described herein relate predominantly to a display screen 5, 7 which can be arranged at the shaping machine 1 and can be mostly connected to a central machine control 2 of the shaping machine 1. For example, the display can be a display 5 for showing performance maps, and/or a display 7 for showing a quality parameter, as noted above. It is, however, also possible for those representations not to be effected directly at the shaping machine 1 but, for example, by way of a data connection (LAN, Internet and so forth) at another computer.

An example of a corresponding visualization is shown in FIG. 1 representing a display screen page of the control in which a performance map is shown. Quality parameters QP are represented by way of the setting parameters EP1 and EP2. Depending on the respective current selection of the values EP1 and EP2 a working point is shown in the performance map. The numerical value thereof could additionally be displayed separately. A slide controller is also shown, by means of which the value of a parameter can be altered. That value can act directly or following a specific command on the function of the machine. Optionally, it is possible to change the value of a second parameter depending on the input of a value for a first setting parameter input via the input device 6 so that in accordance with the performance maps the value of a quality parameter is maximized.

The invention claimed is:

1. A method of setting a shaping machine for performing a cyclically proceeding shaping process, the method comprising:

identifying values for setting parameters, which setting parameters at least partially establish control of controllable components including drives of the shaping machine during the shaping process, performing a plurality of simulations of the shaping process on the basis of at least one variable first parameter and at least one variable second parameter, wherein the at least one first parameter describes physical factors of the shaping process, and the at least one second parameter is a basis for at least one of the setting parameters of the shaping machine, carrying out simulations on the basis of different combinations of values of the at least one variable first parameter and the at least one variable second parameter, calculating values of at least one quality parameter from results of the simulations for the different combinations of values of the at least one variable first parameter and the at least one variable second parameter, providing the shaping machine, ascertaining a value occurring at the shaping machine of the at least one variable first parameter by measurement, determining a value of the at least one variable second parameter from the value measured by said ascertaining of the value of the at least one variable first parameter such that an optimum value of the at least one quality parameter is attained, and setting a setting value at the shaping machine for at least one of the setting parameters, which setting value is the value determined in said determining of the at least one variable second parameter and/or is determined from the value determined in said determining of the at least one variable second parameter.

2. The method as set forth in claim 1, wherein the at least one variable first parameter includes at least one of the following:

parameters concerning kinematics, dynamics, regulators, and wear state and/or parameters including cavity geometry, sprue geometry, hot runner geometry, nozzle geometry, tool material properties, cavity texture, venting, wear, thermal capacity, and/or parameters including injection assembly, dynamics, kinematics, regulator, cylinder diameter, behaviour of a backflow blocking element, screw geometry, nozzle geometry, closing side, rigidity, friction, and/or parameters including filler composition, filler proportion, masterbatch, additives, moisture content, viscosity, pressure-volume-temperature behaviour, thermal conductivity, thermal capacity, coefficient of expansion, modulus of elasticity, shear modulus, coefficient of thermal expansion, and/or parameters including pre-drying, material feed, temperature conditioning, circulating pumps, material mixers, and/or parameters including air humidity and ambient temperature.

3. The method as set forth in claim 1, wherein the at least one variable second parameter is at least one of the following: metering rotary speed profile, dynamic pressure profile, cylinder temperature profile, tool opening and closing profile, closing force profile, metering volume, hot runner temperatures, injection speed profile, post-pressure profile, post-pressure time, switching-over point, peak pressure limit, compression relief strokes, ejector motion profile, tool core motions, temperature conditioning agent temperatures, cooling time and removal device motion profile.

4. The method as set forth in claim 1, wherein selection of at least one of the at least one variable first parameter and the at least one variable second parameter includes use of an expert system, and value ranges for the at least one variable first parameter and/or the at least one variable second parameter are predetermined.

5. The method as set forth in claim 4, wherein, in the selection of the at least one of the at least one variable first parameter and the at least one variable second parameter, known data about at least one of the following are taken into consideration: shaping machine, shaping tool, sprue system, material processed in the shaping process, quality criteria, and machine settings.

6. The method as set forth in claim 5, wherein the data are provided by a databank.

7. The method as set forth in claim 1, wherein the at least one quality parameter concerns at least one of the following:

process properties including individual process times, overall cycle time, robustness, tool loading, energy consumption, necessary closing force, melt temperature, maximum injection pressure, environmental influencing, temperature conditioning requirement, economic efficiency, machine loading, necessary machine size, and/or component properties including shrink marks, dimensional accuracy, color streaks, air streaks, grooves, weld lines, burr, shrinkage, sizes/dimensions, demolding temperature, frozen edge layer thickness, material homogeneity, burns, distortion, material damage, color homogeneity, mass, mechanical stability and thermal stability.

8. The method as set forth in claim 1, wherein values of at least two quality parameters are calculated per combination of values of the at least one variable first parameter and the at least one variable second parameter, wherein weighting of the at least two quality parameters is used.

9. The method as set forth in claim 8, wherein the weighting of the at least two quality parameters is performed based on a global quality criterion.

10. The method as set forth in claim 1, wherein one of the following process variables is calculated from the results of the simulations and used at least in part as a basis for calculation of the values of the at least one quality parameter: mass temperature, shear rate, shear stress, degree of filling, tool wall temperature, density, pressure, viscosity, speed, volume shrinkage, filler distribution and orientation, and mass homogeneity.

11. The method as set forth in claim 1, wherein the simulations include at least one of the following:

process simulation including at least one of a simulation of plasticization, a filling process, a post-pressure phase, a cooling phase, and demolding, material simulation including at least one of a simulation of flow behaviour, a thermal behaviour, a mechanical behavior, and an elastic behaviour, control simulation including at least one of a simulation of component regulators, and machine implementation, machine simulation including at least one of a simulation of injection assembly, closing mechanism, and robotics, and temperature conditioning simulation including at least one of a simulation of heat transport, heat transfer, and flow properties.

12. The method as set forth in claim 1, wherein carry out the simulation includes using at least one of a mathematically analytical model, a numerical model of the shaping machine, and the shaping process.

13. The method as set forth in claim 1, wherein a selection of values for the at least one variable first parameter and the at least one variable second parameter is carried out by statistical test planning.

14. The method as set forth in claim 1, wherein at least one of (i) results of the simulations and (ii) relationships derived from the results of the simulations between the at least one variable first parameter, the at least one variable second parameter, and the at least one quality parameter are transmitted to the shaping machine and stored in a central machine control.

15. The method as set forth in claim 14, wherein the derived relationships are shown at the shaping machine in the form of performance maps.

16. The method as set forth in claim 15, wherein operators select which dependent and independent parameters out of an array including the at least one variable first parameter and the at least one variable second parameter are represented.

17. The method as set forth in claim 1, wherein a value of the at least one quality parameter associated with a combination of values of the at least one variable first parameter and the at least one variable second parameter is represented at the shaping machine.

18. The method as set forth in claim 1, wherein said ascertaining a value implemented at the shaping machine of the at least one variable first parameter by measurement includes carrying out at least one of the following: measuring at least one length, carrying out viscosity measurement, ascertaining the value implemented at the shaping machine of the at least one parameter by at least one of force variations and pressure variations at the shaping machine, manual input by an operator, ultrasound analysis methods, mass spectroscopy, X-ray spectroscopy, computer tomography, optical profilometry, use of a coordinate measuring device, moisture measurement, and performing temperature measurement.

19. The method as set forth in claim 1, wherein the value of the ascertained at least one variable first parameter is transmitted to a separate computing unit, and the value of the at least one variable second parameter derived on the basis of relationships modeled by results of the simulations, is transmitted from a separate computing unit to a central machine control of the shaping machine.

* * * * *